(12) United States Patent
Min et al.

(10) Patent No.: US 9,128,509 B2
(45) Date of Patent: Sep. 8, 2015

(54) ACTIVE CONTROL METHOD OF PEDAL EFFORT FOR ACCELERATOR

(71) Applicants: Hyundai Motor Company, Seoul (KR); Kia Motors Corp., Seoul (KR)

(72) Inventors: Jeong Seon Min, Gwangju (KR); Yang Rae Cho, Suwon-si (KR)

(73) Assignees: HYUNDAI MOTOR COMPANY, Seoul (KR); KIA MOTORS CORP., Seoul (KR)

( * ) Notice: Subject to any disclaimer, the term of this patent is extended or adjusted under 35 U.S.C. 154(b) by 60 days.

(21) Appl. No.: 13/942,429

(22) Filed: Jul. 15, 2013

(65) Prior Publication Data

US 2014/0331813 A1 Nov. 13, 2014

(30) Foreign Application Priority Data

May 7, 2013 (KR) .................. 10-2013-0051145

(51) Int. Cl.
*G06F 7/70* (2006.01)
*G06F 19/00* (2011.01)
(Continued)

(52) U.S. Cl.
CPC ................ *G05G 1/40* (2013.01); *B60K 26/021* (2013.01); *B60W 50/16* (2013.01); *G05G 1/44* (2013.01); *G05G 5/03* (2013.01); *Y10T 74/20534* (2015.01)

(58) Field of Classification Search
CPC ... B60L 15/2036; B60L 11/08; B60L 15/007; B60L 7/006; B60L 11/123; B60K 2007/0038; B60K 6/46; B60K 17/10; B60K 6/34; B60K 41/242; B60W 2510/0638; B60W 10/08; B60W 10/06; B60W 10/02; B60W 20/30; B60W 2530/16; B60W 50/08; B60W 30/18; B60W 10/20; G05G 1/40; G05G 1/44; G05G 5/03; Y10T 477/621; Y10T 477/26; Y10T 477/73; Y10T 74/131; Y10T 74/134
USPC ............. 701/70, 112, 102, 54, 93, 87, 99, 51, 701/53, 67, 90; 180/6.44, 6.7, 9.44, 65.23, 180/65.275
See application file for complete search history.

(56) References Cited

U.S. PATENT DOCUMENTS 6,460,429 B1 * 10/2002 Staker .............................. 74/513
6,467,369 B1 * 10/2002 Mann et al. ..................... 74/513
(Continued)

FOREIGN PATENT DOCUMENTS

JP 2002-323930 A 11/2002
JP 2008-221909 A 9/2008
(Continued)

*Primary Examiner* — Calvin Cheung
*Assistant Examiner* — Luis A Martinez Borrero
(74) *Attorney, Agent, or Firm* — Morgan, Lewis & Bockius LLP

(57) ABSTRACT

An active control method for controlling a pedal effort for an accelerator, may include determining, in a vehicle velocity determining step, whether a vehicle velocity is in 0 (zero) state while the vehicle provided with an accelerator an pedal effort of which is controllable starts-on; determining, in a shifting stage determining step, whether the current shifting stage is on a neutral state or a parking state when it is determined that the vehicle velocity has been in 0 (zero) state in the vehicle velocity determining step; and controlling, in a pedal effort increasing control step, a current pedal effort to increase to a set target pedal effort when it is determined that the current shifting stage has been on the neutral stage or the parking stage in the shifting stage determining step.

7 Claims, 6 Drawing Sheets

(51) Int. Cl.

| | | |
|---|---|---|
| *G06G 7/00* | (2006.01) | |
| *G06G 7/76* | (2006.01) | |
| *G05G 1/40* | (2008.04) | |
| *B60W 50/16* | (2012.01) | |
| *G05G 1/44* | (2008.04) | |
| *G05G 5/03* | (2008.04) | |
| *B60K 26/02* | (2006.01) | |

(56) References Cited

U.S. PATENT DOCUMENTS

| | | | |
|---|---|---|---|
| 6,766,713 B2 * | 7/2004 | Sundaresan et al. | 74/512 |
| 6,782,775 B2 * | 8/2004 | Hayashihara | 74/512 |
| 6,857,336 B2 * | 2/2005 | Staker | 74/513 |
| 7,270,028 B2 * | 9/2007 | Rixon et al. | 74/512 |
| 7,404,342 B2 * | 7/2008 | Wurn | 74/512 |
| 7,640,826 B2 * | 1/2010 | Weldon et al. | 74/512 |
| 7,681,474 B2 * | 3/2010 | Weldon et al. | 74/512 |
| 7,739,022 B2 * | 6/2010 | Kobayashi et al. | 701/70 |
| 8,042,430 B2 * | 10/2011 | Campbell | 74/513 |
| 8,069,750 B2 * | 12/2011 | Willemsen et al. | 74/512 |
| 8,145,389 B2 * | 3/2012 | Kobayashi et al. | 701/49 |
| 8,240,230 B2 * | 8/2012 | Peniston et al. | 74/512 |
| 8,433,492 B2 * | 4/2013 | Shiomi et al. | 701/70 |
| 8,532,900 B2 * | 9/2013 | Maruyama et al. | 701/70 |
| 8,634,939 B2 * | 1/2014 | Martin et al. | 700/22 |
| 8,855,881 B2 * | 10/2014 | Kobayashi et al. | 701/70 |
| 2001/0047235 A1 * | 11/2001 | Mardberg | 701/70 |
| 2003/0055551 A1 * | 3/2003 | Weber et al. | 701/93 |
| 2003/0236608 A1 * | 12/2003 | Egami | 701/70 |
| 2005/0090984 A1 * | 4/2005 | Kobayashi et al. | 701/301 |
| 2005/0216162 A1 * | 9/2005 | Suzuki et al. | 701/70 |
| 2005/0256627 A1 * | 11/2005 | Sah et al. | 701/70 |
| 2006/0287800 A1 * | 12/2006 | Watanabe et al. | 701/96 |
| 2006/0293825 A1 * | 12/2006 | Sporl et al. | 701/93 |
| 2007/0038336 A1 * | 2/2007 | Yamamura et al. | 701/1 |
| 2008/0134830 A1 * | 6/2008 | Park | 74/514 |
| 2009/0055073 A1 * | 2/2009 | Matsubara et al. | 701/102 |
| 2009/0112382 A1 * | 4/2009 | Treharne et al. | 701/22 |
| 2010/0030414 A1 * | 2/2010 | Watanabe et al. | 701/22 |
| 2010/0069196 A1 * | 3/2010 | Shibata et al. | 477/3 |
| 2010/0087975 A1 * | 4/2010 | Dower | 701/22 |
| 2011/0087414 A1 * | 4/2011 | Shiomi et al. | 701/70 |
| 2011/0098898 A1 * | 4/2011 | Stahlin et al. | 701/70 |
| 2011/0178684 A1 * | 7/2011 | Umemoto et al. | 701/51 |
| 2011/0251747 A1 * | 10/2011 | Imai et al. | 701/22 |
| 2012/0221220 A1 * | 8/2012 | Yamazaki et al. | 701/70 |
| 2012/0291587 A1 * | 11/2012 | Sakaguchi et al. | 74/513 |
| 2013/0041564 A1 * | 2/2013 | Doi et al. | 701/70 |
| 2013/0297105 A1 * | 11/2013 | Yamazaki et al. | 701/22 |
| 2014/0342865 A1 * | 11/2014 | Hayashi et al. | 475/5 |

FOREIGN PATENT DOCUMENTS

| | | |
|---|---|---|
| KR | 20-0153432 Y1 | 7/1997 |
| KR | 0177958 B1 | 7/1997 |
| KR | 10-2006-0003644 A | 1/2006 |
| KR | 10-2009-0063016 A | 6/2009 |
| KR | 10-2010-0063453 A | 6/2010 |
| KR | 10-2013-0044010 A | 5/2013 |

* cited by examiner

ACTIVE CONTROL METHOD OF PEDAL EFFORT FOR ACCELERATOR

CROSS REFERENCE TO RELATED APPLICATION

The present application claims priority of Korean Patent Application Number 10-2013-0051145 filed May 7, 2013, the entire contents of which application are incorporated herein for all purposes by this reference.

BACKGROUND OF INVENTION

1. Field of Invention

The present invention relates to an active control method of pedal effort for an accelerator, and more particularly, to an active control method of pedal effort for an accelerator capable of varying actively the pedal effort for an accelerator to increase when the shifting stage is on a neutral N stage or a parking P stage while a vehicle provided with an accelerator, a pedal effort of which is controllable, stops temporally during a driving.

2. Description of Related Art

An accelerator of an organ type for a vehicle is shown in FIG. 1 as an example of an accelerator for a vehicle wherein an accelerator according to a related art includes a pedal arm housing 1 that is fixed to a vehicle body panel under a driver's seat, a pedal arm 2 one end of which is connected rotatably to the pedal arm housing 1, a pedal bracket 3 that is fixed to a floor panel under a driver's seat, and a pedal pad 4 one end of which is hinged rotatably to the pedal bracket 3 and the other part of which is ball-jointed to the pedal arm 2.

Here, a spring plate 5 is connected to one end of the pedal arm 2 disposed within the pedal arm housing 1 wherein one end of a spring 6 is supported at the spring plate 5 and the other end thereof is supported at the pedal arm housing 1.

Accordingly, in the accelerator according to a related art as describe above, the pedal effort is transmitted to the pedal pad 4 such that the spring 6 is compressed when the pedal arm 2 rotates through a hinge shaft 7 with respect to the pedal arm housing 1.

However, according to the accelerator of a related art, since the spring 6 an elastic coefficient of which is set in advance to meet safety regulations prescribed by each nation has to be used therein, it is impossible to control the pedal effort without replacing the spring 6 with a new one, and thus there is no method of controlling actively the pedal effort for an accelerator when the shifting stage is on a neutral N stage or a parking P stage while a vehicle stops temporally during a driving.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve at least some of the above-described problems associated with prior art and various aspects of the present invention provide an active control method for varying actively the pedal effort for an accelerator to increase when the shifting stage is on a neutral N stage or a parking P stage while a vehicle provided with an accelerator a pedal effort of which is controllable stops temporally during a driving, to prevent a rapid starting when a vehicle restarts after the stopping thereby to improve safety and reduce unnecessary consumption of fuel.

An active control method for controlling a pedal effort for an accelerator may include determining, in a vehicle velocity determining step, whether a vehicle velocity is in 0 (zero) state while the vehicle provided with an accelerator an pedal effort of which is controllable starts-on; determining, in a shifting stage determining step, whether the current shifting stage is on a neutral state or a parking state when it is determined that the vehicle velocity has been in 0 (zero) state in the vehicle velocity determining step; and controlling, in a pedal effort increasing control step, a current pedal effort to increase to a set target pedal effort when it is determined that the current shifting stage has been on the neutral stage or the parking stage in the shifting stage determining step.

The active control method may further include determining, in a pedal effort control system determining step and prior to the vehicle velocity determining step, whether a pedal effort control system is in a normal state while a vehicle starts-on.

The vehicle velocity determining step may be performed only when it is determined that the pedal effort control system has been in a normal state in the pedal effort control system determining step, and the current pedal effort for an accelerator may be reset as an initial pedal effort state when it is determined that the pedal effort control system has been in an abnormal state.

The pedal effort control system may be determined to be in a normal state in the pedal effort control system determining step when a voltage signal of a battery is normal, there is no signal for initiating the pedal effort control system pursuant to an urgent situation, and the signal for a pedal effort active control mode is generated.

When it is determined that the vehicle velocity has not been in 0 (zero) state in the vehicle velocity determining step, the accelerator may be determined to operate, and the current pedal effort for the accelerator may be kept as an existing pedal effort (right previous pedal effort) state while the accelerator operates.

The active control method may further include determining, in an accelerator operation determining step and subsequent to the pedal effort increasing control step, whether the accelerator is operated.

When it is determined that the accelerator has been operated in the accelerator operation determining step, mal-operation signal may be provided to the driver.

The active control method may further include determining, in a shifting stage variation determining step, whether the current shifting stage is switched to a driving stage or a reverse stage when it is determined that the accelerator has not been operated in the accelerator operation determining step.

The current pedal effort may be kept as a pedal effort that is increased through the pedal effort increasing control step when it is determined that the shifting stage has not been switched to the driving stage or the reverse stage in the shifting stage variation determining step.

The current pedal effort that is increased through the pedal effort increasing control step may be controlled to decrease to a set target pedal effort when it is determined that the shifting stage has been switched to the driving stage or the reverse stage in the shifting stage variation determining step.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

Figure 1:
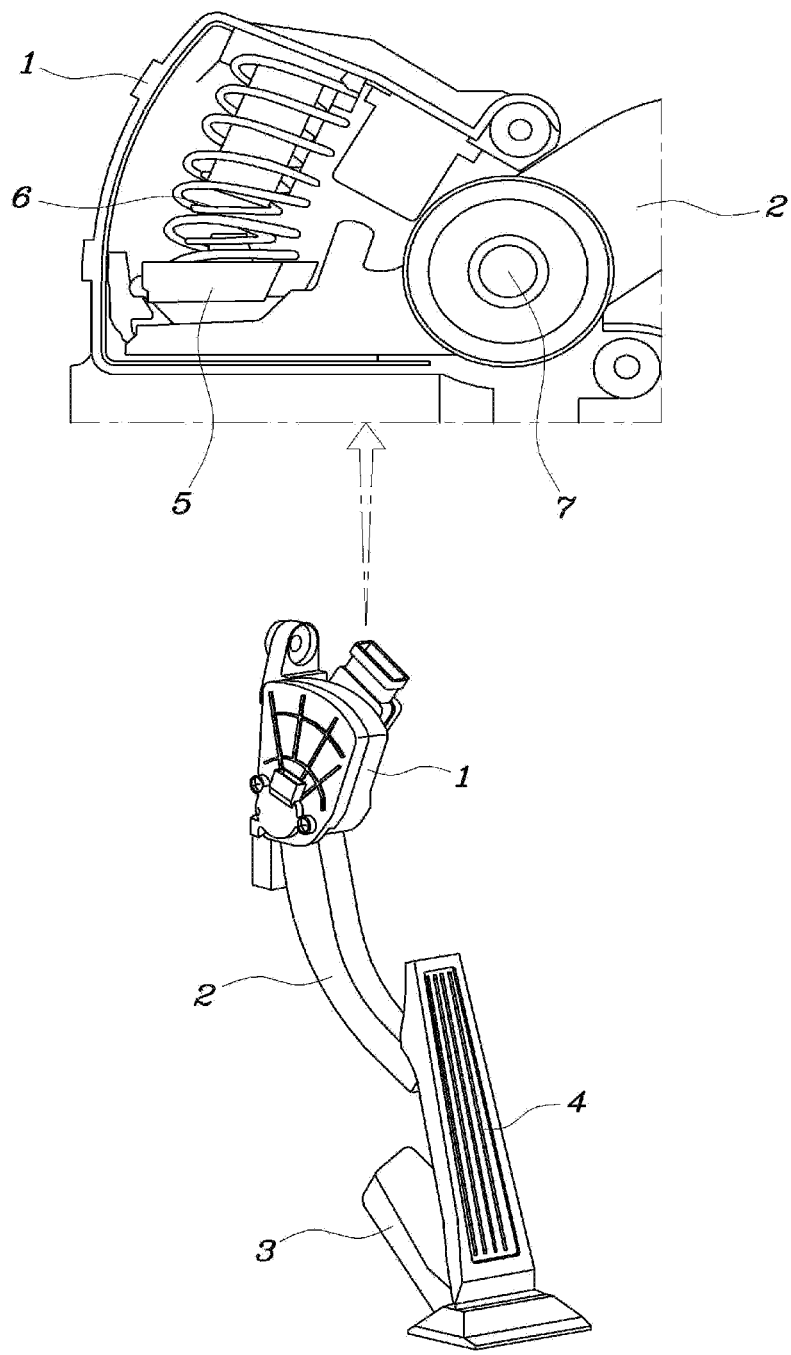
FIG. 1 is a perspective view illustrating an accelerator not having a pedal effort control function according to a related art.
Figure 2:
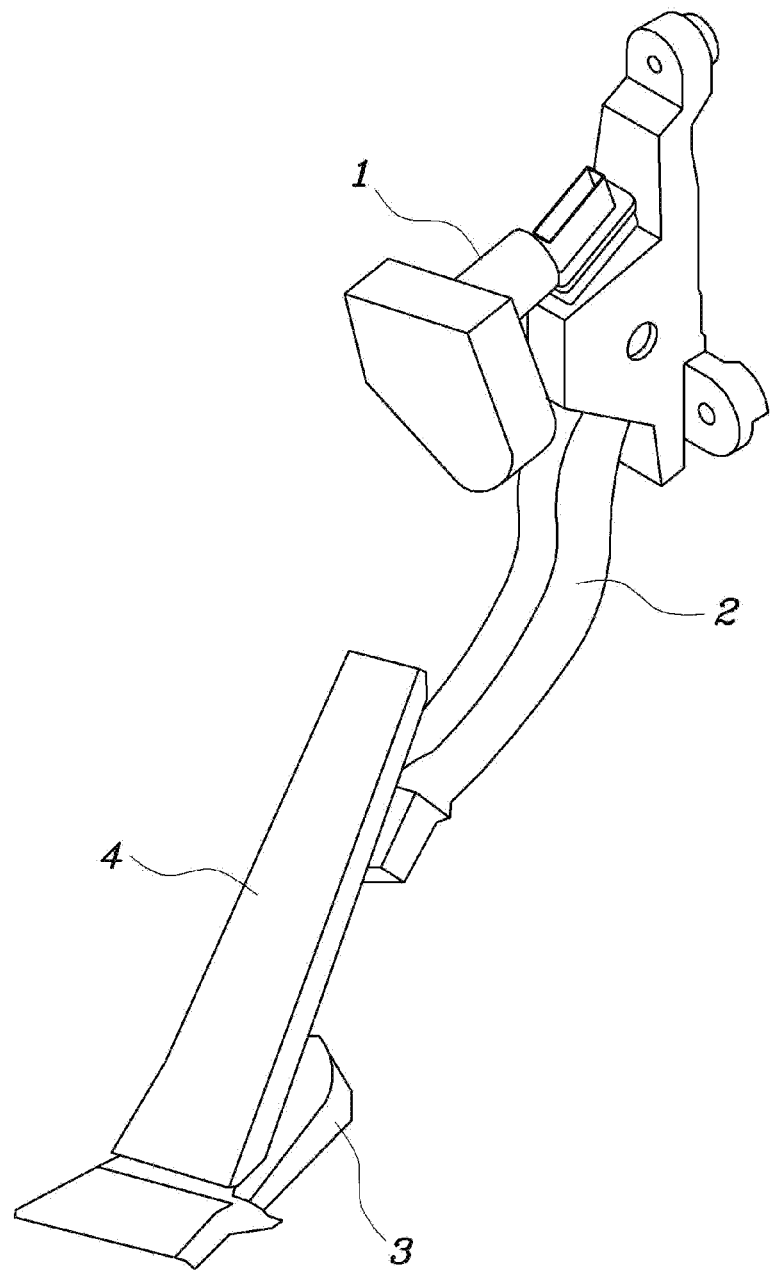
FIGS. 2, 3, 4 and 5 are views illustrating an exemplary accelerator having a pedal effort control function according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An accelerator for a vehicle having a pedal effort control function may include, as shown in FIGS. 2 to 5, a pedal arm housing 1 that is fixed to a vehicle body panel under a driver's seat, a pedal arm 2 one end of which is connected rotatably to the pedal arm housing 1, a pedal bracket 3 that is fixed to a floor panel under a driver's seat, and a pedal pad 4 one end of which is hinged rotatably to the pedal bracket 3 and the other part of which is ball jointed to the pedal arm 2.

Here, a spring plate 5 may be connected to one end of the pedal arm 2 disposed within the pedal arm housing 1 and the pedal arm 2 may be connected rotatably to the pedal arm housing 1 through a hinge shaft 7.

An accelerator according to various embodiments of the present invention is provided with a pedal effort control module 10 wherein the pedal effort control module 10 includes: a spring 11 one end of which is supported on an end of the pedal arm 2 disposed within the pedal arm housing 1; a spring fixing block 12 that is arranged to support the other end of the spring 11; a motor 13 that is fixed to the pedal arm housing 1; and a power transmission mechanism 14 that transmits power from the motor 13 to the spring fixing block 12 and moves the spring fixing block 12 to vary a length of the spring 11.

Figure 3:
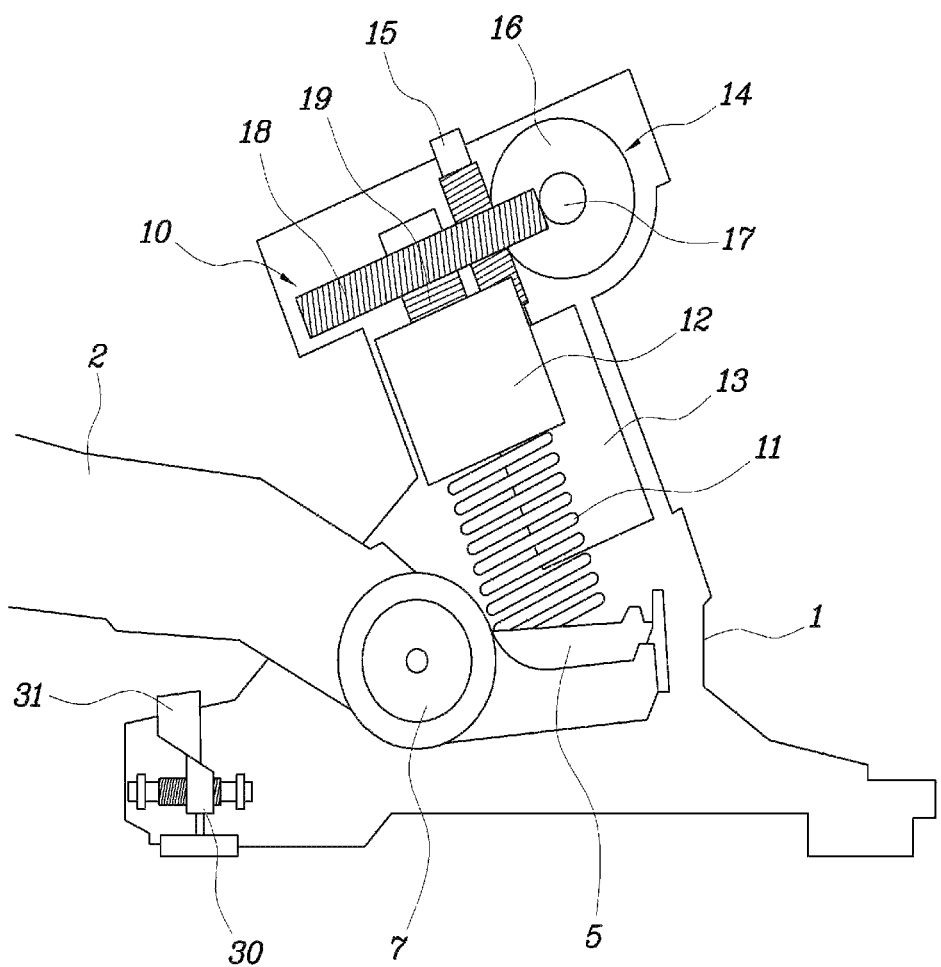
Figure 4:
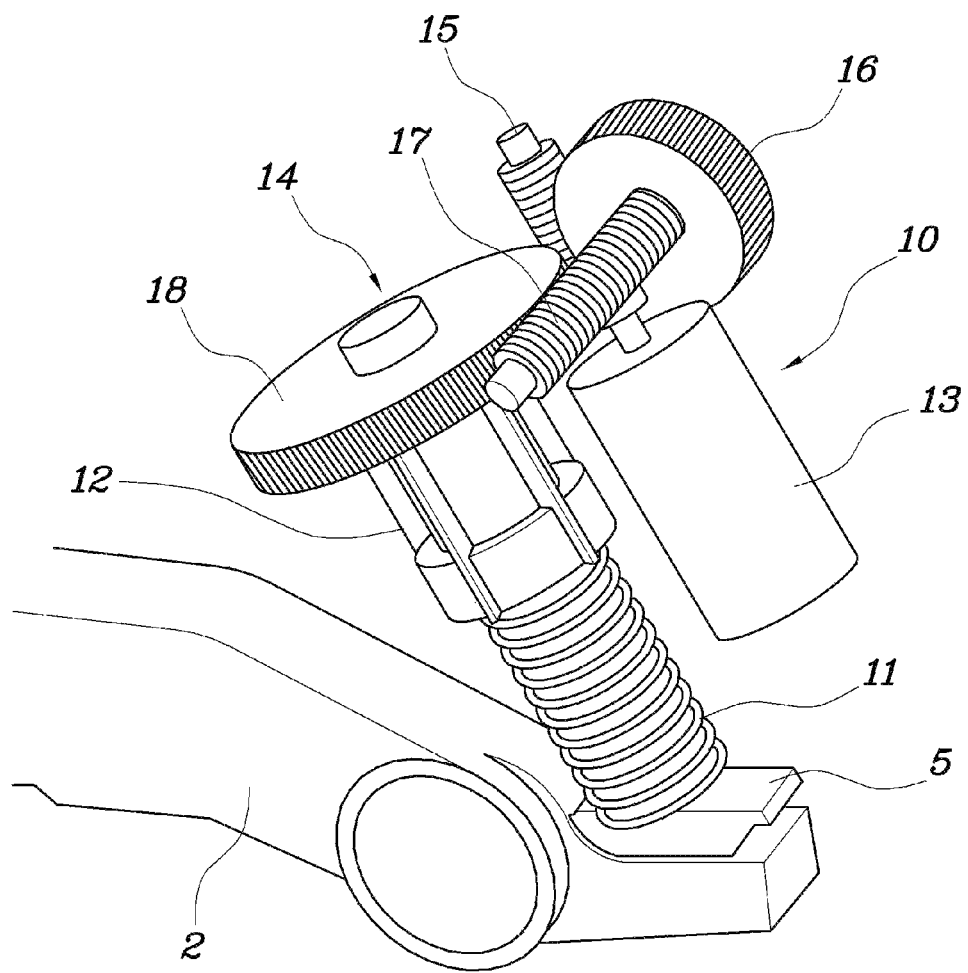
Figure 5:
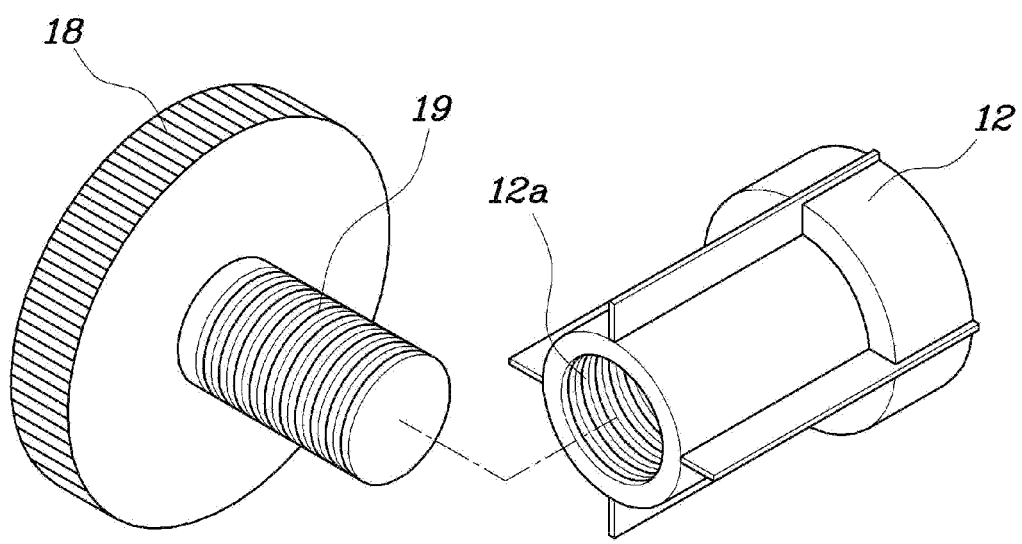

Here, the spring 11 may be supported directly on one end of the pedal arm 2, or the lower part of the spring 11 may be supported on the spring plate 5 that is connected to one end of the pedal arm 2 disposed within the pedal arm housing 1, as shown in FIGS. 3 and 4.

Accordingly, when the pedal arm 2 rotates around the hinge shaft 7, the spring 11 is compressed and deformed elastically between the spring plate 5 and the spring fixing block 12 and at this time the pedal effort is provided to the pedal pad 4 through the pedal arm 2.

The power transmission mechanism 14 is arranged to connect the motor 13 and the spring fixing block 12 for transmitting power from the motor 13 to the spring fixing block 12 wherein it includes a first worm gear 15 that is coupled integrally to a shaft of the motor 13, a first worm wheel gear 16 that is meshed with the first worm gear 15, a second worm gear 17 that is coupled integrally to a center of the first worm wheel gear 16, a second worm wheel gear 18 that is meshed with the second worm gear 17, and a gear bolt 19 which protrudes integrally from a center of the second worm wheel gear 18 and on outer peripheral surface of which a plurality of threads are processed. One will appreciate that the integral components may be monolithically formed.

Furthermore, a plurality of screw-grooves 12a are processed on an inner peripheral surface of the spring fixing block 12 to be screw-fastened to the gear bolt 19 wherein when the second worm wheel gear 18 rotates, the spring fixing block 12 moves straightly along the gear bolt 19 to vary a length of the spring 11 due to a movement of the spring fixing block 12 and thereby to vary a pedal effort.

Meanwhile, an operation of the motor 13 may be controlled automatically by a controller in accordance with a driving condition, a driver's condition, a driving inclination of the driver and locations of the shifting stages, etc.

A vehicle is provided with the accelerator pedal effort of which is controllable using the pedal effort control module 10 wherein the pedal effort for an accelerator can be varied actively to increase when a driver locates the shifting stage on a neutral N stage or a parking P stage from a driving D stage while a vehicle stops temporally during a driving.

That is, in a case where a vehicle stops temporally during a driving, for example, to follow a traffic signal light, a driver may operate to vary the shifting stage to a neutral N stage or a parking P stage from a driving D stage to reduce fuel consumption. After that, in a situation where the vehicle that is stopped temporally during a driving intends to restart, the driver operates directly an accelerator while he/she forgets varying the shifting stage that is located on a neutral N stage or a parking P stage to a driving D stage again.

As described above, when the driver operates the accelerator without varying or switching the shifting stage to the driving D stage, RPM of the vehicle increases abruptly, and when the shifting stage is varied to the driving D stage in a situation where the RPM of the vehicle increases abruptly, the concern about rapid starting of the vehicle increases to threaten a safety driving and consume unnecessarily fuel.

Accordingly, the pedal effort for an accelerator can be varied to increase to a target pedal effort when a driver varies the shifting stage to the neutral N stage or the parking P stage from the driving D stage in a situation where a vehicle stops temporally during a driving.

When a driver operates directly the accelerator without varying or switching the shifting stage back to the driving D stage, which is located on the neutral N stage or the parking P stage, while the pedal effort for an accelerator is varied to increase, as described above, in a situation where a vehicle that is stopped temporally during a driving intends to restart, the driver may recognize easily that the current shifting stage is on the neutral N stage or the parking P stage through the increased pedal effort for an accelerator, and thus a rapid increasing of RPM, a rapid starting and unnecessary consumption of fuel can be prevented.

Meanwhile, when a driver varies or switches the shifting stage back to the driving D stage, which is located on a neutral N stage or a parking P stage for restarting the vehicle that is stopped temporally, the increased pedal effort for an accelerator is varied to decrease again to a target pedal effort, and as a result the driver may operate easily the accelerator.

Figure 6:
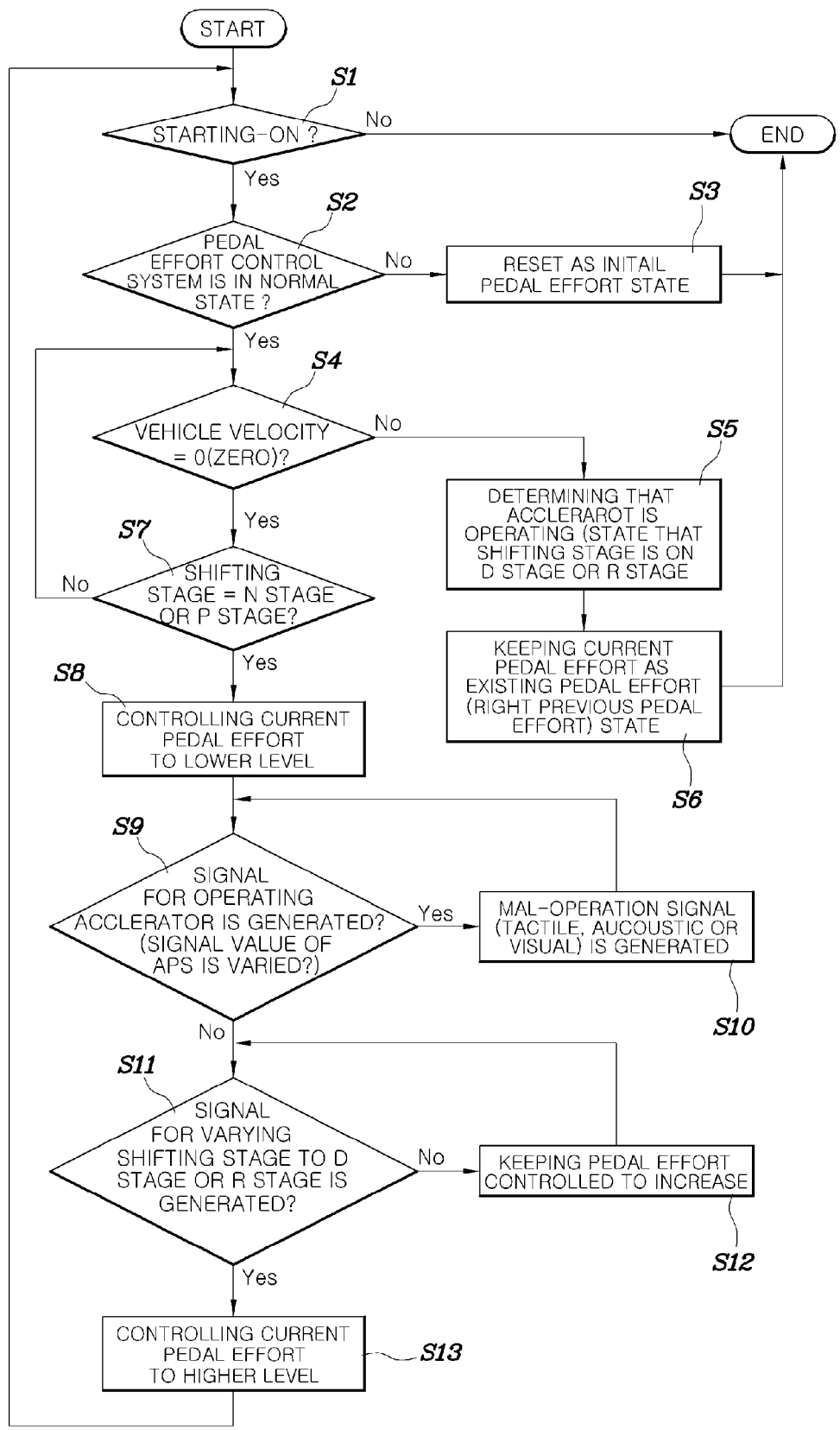
FIG. 6 is a flowchart illustrating an exemplary method of controlling actively the pedal effort for an accelerator having a pedal effort control function according to the present invention.

An active control method for controlling a pedal effort for an accelerator according to various embodiments of the present invention, as shown in FIG. 6, may include: determining whether a pedal effort control system is in a normal state while a vehicle provided with an accelerator a pedal effort of which is controllable starts-on; determining whether a vehicle velocity is in 0 (zero) state when it is determined that the pedal effort control system has been in a normal state in the pedal effort control system determining step; determining whether the current shifting state is on a neutral N stage or a parking P stage when it is determined that the vehicle velocity has been in 0 (zero) state in the vehicle velocity determining step; and controlling the current pedal effort to increase to a set target pedal effort when it is determined that the current shifting stage has been on the neutral N stage or the parking P stage in the shifting stage determining step.

Here, the vehicle velocity determining step is performed only when it is determined that the pedal effort control system is in a normal state in the pedal effort control system determining step. The pedal effort control system is determined as being in a normal state only when all conditions are satisfied, including: a voltage signal of a battery is normal, a signal for initializing the system is not requested and the signal for a pedal effort active control mode is generated.

Furthermore, when the pedal effort control system is determined as being in an abnormal state in the pedal effort control system determining step, the current pedal effort for an accelerator is reset as an initial pedal effort state. Here, the initial pedal effort state refers to a reset state of the pedal effort.

Further, when it is determined that the vehicle velocity has not been in 0 (zero) state in the vehicle velocity determining step, it is determined that the accelerator is an operating state (a state where the shifting stage is on a driving D stage or a reverse R stage) and in the operating state of the accelerator the current pedal effort for the accelerator is kept as an existing pedal effort (right previous pedal effort) state.

Meanwhile, the active control method for controlling a pedal effort for an accelerator according to various embodiments of the present invention further includes determining whether the accelerator is operated (whether signal value of Accelerator Position Sensor (APS) is varied) after the pedal effort increasing control step wherein a signal of mal-operation is provided to a driver when it is determined that the accelerator has been operated in the accelerator operation determining step.

The mal-operation signal that is provided to a driver may be a tactile signal using shake and vibration of the pedal caused from an operation of the motor 13, an acoustic signal using a sound producer or a visual signal.

Further, the active control method for controlling a pedal effort for an accelerator further includes determining whether the current shifting stage located on the neutral N stage or the parking P stage is varied or switched to a driving D stage or a reverse R stage when it is determined that the accelerator has not been operated in the accelerator operation determining step.

Here, the current pedal effort is kept as the pedal effort for an accelerator that is increased through the pedal effort increasing control step when it is determined that the shifting stage has not been varied to the driving D stage or the reverse R stage in the shifting stage variation step, and the current pedal effort for an accelerator that is increased through the pedal effort increasing control step is controlled to decrease to a set target pedal effort when it is determined that the shifting stage has been varied to the driving D stage or the reverse R stage in the shifting stage variation determining step.

Hereinafter, the operations of the present embodiment according to the present invention will be described, and firstly a control of a pedal effort for an accelerator will be described.

The motor 13 is operated by a controller and power from the motor 13 is transmitted to the spring fixing block 12 through the worm gears 15, 17, the worm wheel gears 16, 18 and the gear bolt 19, and then the spring fixing block 12 moves upward or downward along the gear bolt 19 in a state shown in FIG. 3.

When the spring fixing block 12 moves upward along the gear bolt 19 (to a receding direction from the spring plate), the spring 11 is lengthened through its elastic recovery, and at this time the pedal effort for an accelerator decreases due to the decreasing of spring force applying to the pedal arm 2.

On the contrary, when the spring fixing block 12 moves downward along the gear bolt 19 (to an approaching direction to the spring plate), the spring 11 is shortened by being compressed, and at this time the pedal effort for an accelerator increases due to the increasing of spring force applying to the pedal arm 2.

The motor 13 is configured to operate automatically with a controller wherein, for an example, when a driver locates the shifting stage on a neutral N stage or a parking P stage from a driving D stage while a vehicle stops temporally during a driving, the pedal effort for an accelerator can be varied actively to increase. Further, when the driver shifts the shifting stage located on the neutral N stage or the parking P stage to the driving D stage for restarting the vehicle that is stopped temporally, the increased pedal effort is varied to decrease back to a target pedal effort.

Further, the pedal effort is controlled to be a lower level in a low speed driving (downtown driving) thereby to reduce fatigue caused from an operation of an accelerator, and the pedal effort is controlled to increase in a high speed driving (expressway driving) thereby to reduce ankle fatigue of a driver by helping the pedal to be supported constantly.

Furthermore, the pedal effort is decreased to increase pedal operation amount on an uphill road and the pedal effort is increased to decrease the pedal operation amount on a downhill road.

In addition, the pedal effort is increased to ensure safety in an over speed driving or on a safety mode and further the pedal effort may be controlled properly, considering an age, sex or condition of a driver.

Next, a method of actively controlling a pedal effort for an accelerator a pedal effort of which is controllable provided in a vehicle in accordance with the locations of the shifting stage when a vehicle stops temporally will be described, referring to FIG. 6.

When a vehicle starts-on (step S1), a controller determines whether a pedal effort control system is in a normal state (step S2) wherein the pedal effort control system is determined as in a normal state, when all conditions are satisfied such that a voltage signal of a battery is in a normal state, there is no signal for initiating the system pursuant to an urgent situation, and the signal for a pedal effort active control mode is generated.

Here, the pedal effort control system is determined as being in a normal state, when the voltage signal of a battery is 9V to 16.5V.

If the pedal effort control system is determined as being in an abnormal state, the current pedal effort for an accelerator is reset as the initial pedal effort state (step S3).

Meanwhile, it is determined whether the current vehicle velocity is in 0 (zero) state when it is determined that the pedal effort control system has been in a normal state (step S4), and at this time the accelerator is determined to operate when the vehicle velocity is determined not to be in 0 (zero) state (step S5), and the current pedal effort for an accelerator is kept as an existing pedal effort (right previous pedal effort) state when the accelerator is determined to operate and then the logic for controlling the pedal effort is ended forcibly (step S6).

Further, it is determined whether the current shifting stage is on a neutral N stage or a parking P stage when it is determined that the current vehicle velocity is on 0 (zero) state while the pedal effort control system is on a normal state (step S7).

Here, when it is determined that the current shifting stage has not been on the neutral N stage or the parking P stage, the logic feeds back to step S4 for determining whether the vehicle velocity is in 0 (zero) state, and when it is determined that the current shifting stage has been on the neutral N stage or the parking P stage, the current pedal effort for an accelerator is controlled to increase a set target pedal effort (step S8).

As described above, when a driver varies the shifting stage to the neutral N stage or the parking P stage from the driving D stage in a situation where a vehicle stops temporally during a driving, and the pedal effort for an accelerator is controlled to increase to the target pedal effort, even though the driver operates directly the accelerator with forgetting varying the shifting stage back to the driving D stage, which is located on the neutral N stage or the parking P stage, in a situation where the vehicle that is stopped temporally restarts, he/she may recognize easily that the current shifting stage is on the neutral N stage or the parking P stage, and as a result a rapid increasing of RPM and a rapid starting of a vehicle, and unnecessary consumption of fuel can be prevented.

Meanwhile, after step S8, it is determined whether the signal for operating the accelerator is generated through the variation of signal value of APS (step S9), and at this time when it is determined that the signal for operating the accelerator has been generated (that it is determined that the accelerator has been operated), the mal-operation signal is provided to a driver through a tactile signal, an acoustic signal and a visual signal (step S10) wherein the driver ends the mal-operation of the accelerator with the mal-operation signal.

Furthermore, when it is determined that the signal for operating the accelerator has not been generated (that it is determined that the accelerator has not been operated), a controller determines whether the current shifting stage is varied to the driving D stage or the reverse R stage from the neutral N stage or the parking P stage (step S11), and at this time when it is determined that the current shifting stage has not been varied to the driving D stage or the reverse R stage from the neutral N stage or the parking P stage, the current pedal effort is kept continuously as the pedal effort that is increased through step S8 (step 12).

However, when it is determined that the current shifting stage has been varied to the driving D stage or the reverse R stage from the neutral N stage or the parking P stage, the current pedal effort that is increased through step S8 is controlled to decrease to a set target pedal effort (step S11), and after that the logic feeds back to step S1 and repeats.

As described above, when a shifting stage is located on a neutral N stage or a parking P stage while a vehicle provided with an accelerator an pedal effort of which is controllable stops temporally during a driving, the pedal effort for an accelerator can be varied to increase and then a rapid operation of the accelerator can be prevented in a case where the vehicle restarts, and thus a rapid starting of the vehicle can be prevented to increase safety and further unnecessary consumption of fuel can be prevented.

As described above, under the accelerator according to various embodiments of the present invention, a length of the spring 11 can be varied by the movement of the spring fixing block 12 through the operation of the motor 13 without replacing separately components thereby to vary easily the pedal effort, if necessary, for satisfying fully the safety regulations with respect to the pedal effort for an accelerator regardless of kinds of vehicle.

Further, when a shifting stage is located on a neutral N stage or a parking P stage while vehicle stops temporally during a driving, the pedal effort for an accelerator can be varied to increase and thus a rapid starting can be prevented when the vehicle restarts thereby to improve safety and reduce unnecessary consumption of fuel.

According to the active control method for controlling a pedal effort for an accelerator, the pedal effort is controlled actively to increase when the shifting stage is located on a neutral stage or a parking stage while a vehicle stops temporally during a driving, to prevent a rapid operation of the accelerator when the vehicle restarts after the stopping, thereby to prevent a rapid starting of the vehicle and improve safety and reduce unnecessary consumption of fuel.

For convenience in explanation and accurate definition in the appended claims, the terms "inner" or "outer", "upward" or "downward", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active control method for controlling a pedal effort for an accelerator, comprising:
   determining by a controller, in a vehicle velocity determining step, whether a vehicle velocity is in a 0 (zero) state while the vehicle provided with an accelerator and an pedal effort of which is controllable starts-on;
   determining by the controller, in a shifting stage determining step, whether the current shifting stage is on a neutral state or a parking state when it is determined that the vehicle velocity has been in 0 (zero) state in the vehicle velocity determining step; and controlling by the controller, in a pedal effort increasing control step, a current pedal effort to increase to a set target pedal effort when it is determined that the current shifting stage has been on the neutral stage or the parking stage in the shifting stage determining step, determining by the controller, in an accelerator operation determining step and subsequent to the pedal effort increasing control step, whether the accelerator is operated, determining, in a shifting stage variation determining step, whether the current shifting stage is switched to a driving stage or a reverse stage when it is determined that the accelerator has not been operated in the accelerator operation determining step wherein the current pedal effort that is increased through the pedal effort increasing control step is controlled to decrease to a set target pedal effort when it is determined that the shifting stage has been switched to the driving stage or the reverse stage in the shifting stage variation determining step.

2. The active control method of claim 1, further comprising:

determining by the controller, in a pedal effort control system determining step and prior to the vehicle velocity determining step, whether a pedal effort control system is in a normal state while a vehicle starts-on.

3. The active control method of claim 2, wherein the vehicle velocity determining step is performed by the controller only when it is determined that the pedal effort control system has been in a normal state in the pedal effort control system determining step, and the current pedal effort for an accelerator is reset as an initial pedal effort state when it is determined that the pedal effort control system has been in an abnormal state.

4. The active control method of claim 2, wherein the pedal effort control system is determined by the controller to be in a normal state in the pedal effort control system determining step when a voltage signal of a battery is normal, there is no signal for initiating the pedal effort control system pursuant to an urgent situation, and the signal for a pedal effort active control mode is generated.

5. The active control method of claim 1, wherein when it is determined by the controller that the vehicle velocity has not been in the 0 (zero) state in the vehicle velocity determining step, the accelerator is determined to operate, and the current pedal effort for the accelerator is kept as an existing pedal effort (right previous pedal effort) state while the accelerator operates.

6. The active control method of claim 1, wherein when it is determined by the controller that the accelerator has been operated in the accelerator operation determining step, maloperation signal is provided to the driver.

7. The active control method of claim 1, wherein the current pedal effort is kept as a pedal effort that is increased through the pedal effort increasing control step when it is determined that the shifting stage has not been switched to the driving stage or the reverse stage in the shifting stage variation determining step.

* * * * *